United States Patent [19]

Kawai et al.

[11] Patent Number: 4,901,162
[45] Date of Patent: Feb. 13, 1990

[54] IMAGE READING AND RECORDING APPARATUS

[75] Inventors: Kenji Kawai; Kazuma Kan, both of Shiga; Takumi Yoshida, Kyoto, all of Japan

[73] Assignee: Dainippon Screen Mfg. Co., Ltd., Japan

[21] Appl. No.: 121,520

[22] Filed: Nov. 17, 1987

[30] Foreign Application Priority Data

Nov. 25, 1986 [JP] Japan ............................ 61-180855[U]

[51] Int. Cl.⁴ .............................................. H04N 1/04
[52] U.S. Cl. .................................................... 358/468
[58] Field of Search .................................. 358/401, 468

[56] References Cited

U.S. PATENT DOCUMENTS

| | | | |
|---|---|---|---|
| 4,080,634 | 3/1978 | Schreiber. | |
| 4,340,894 | 7/1982 | Oono | 358/302 |
| 4,450,485 | 5/1984 | Oshikoshi | 358/302 |
| 4,520,400 | 5/1985 | Koumura | 358/256 |
| 4,562,444 | 12/1985 | Nagashima | 358/296 |
| 4,656,525 | 4/1987 | Norris | 358/401 |
| 4,675,741 | 6/1987 | Shinohara | 358/256 |
| 4,733,309 | 3/1988 | Mori | 358/285 |

FOREIGN PATENT DOCUMENTS 0167554 7/1988 Japan.

Primary Examiner—Edward L. Coles, Sr.
Assistant Examiner—Jerome Grant
Attorney, Agent, or Firm—Ostrolenk, Faber, Gerb & Soffen

[57] ABSTRACT

An image reading and recording apparatus comprises a single housing, a moving type original holder provided on the housing, an image reading station including a fixed type image forming optical system provided in the uppermost portion of said housing, a magazine located in the housing horizontally adjacent to the image reading station, an image recording station located in the housing below the image reading station and an electrical control unit for image reading and for image recording located in the housing below the image recording station.

14 Claims, 2 Drawing Sheets

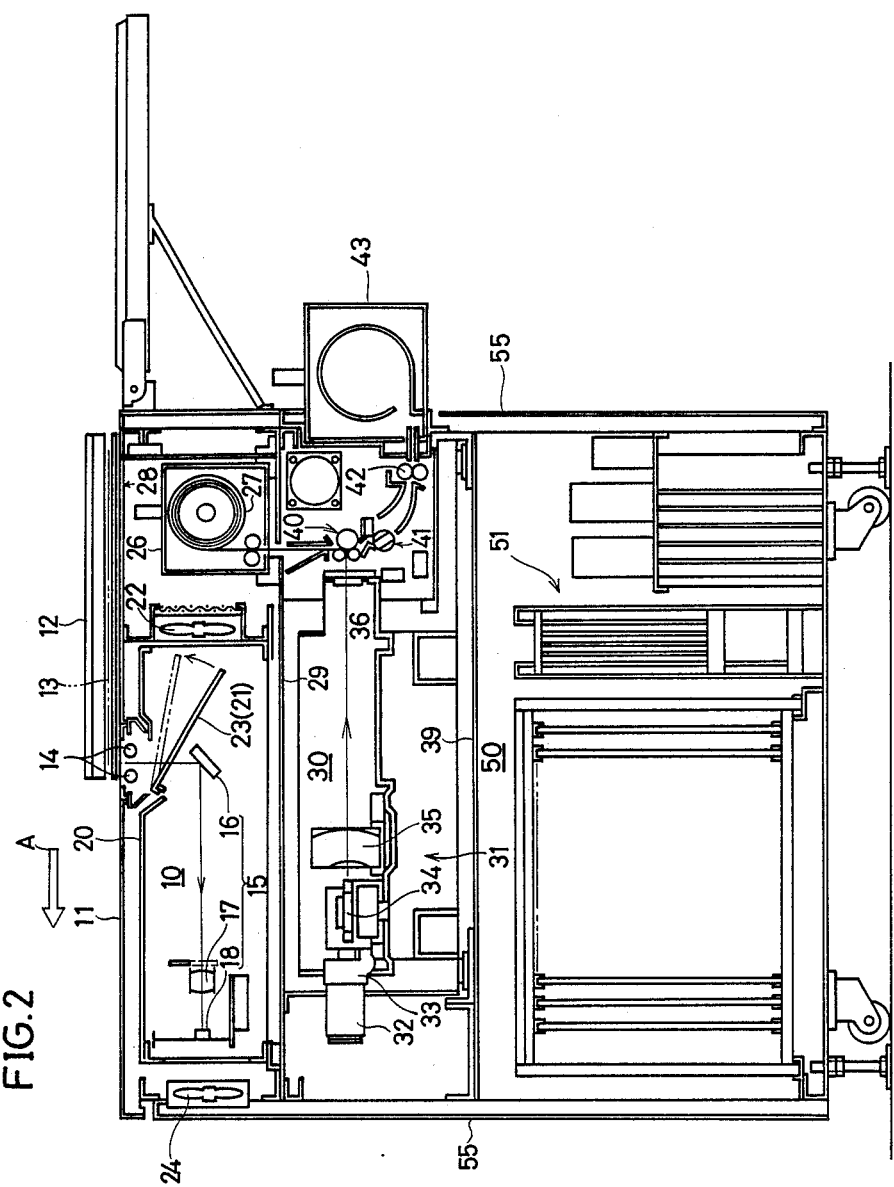

IMAGE READING AND RECORDING APPARATUS

BACKGROUND OF THE INVENTION

1. Field of the Invention

The present invention relates to an image reading and recording apparatus and, more specifically, it relates to an image reading and recording apparatus which is compact and is easily maintained.

2. Description of the Prior Art

An image reading and recording apparatus such as shown in FIG. 1 is conventionally known.

The image reading and recording apparatus comprises an image reading station 110 and an image recording station 130 provided below the image reading station 110.

The image reading station 110 comprises an original holder 112 for holding an original 113 fixedly thereon, a movable optical system 115 for transmitting an image on the original to a light receiving device 118 while moving, a light receiving device 118 for reading the image and photoelectrically transforming the same to electric signals, an illuminating lamp 114 for illuminating the original and an electric control unit 151 for processing the electric signals transformed by the light receiving device.

The image recording station 130 comprises a laser unit 132 for emitting laser beams for recording the image on a photosensitive material, a film magazine 126 for storing the photosensitive material 127 for recording the image thereon and an electric control unit 152 for recording the image.

The image reading station 110 and the image recording station 130 are contained in respective independent housings 111 and 131.

The process for reproducing an original image is as follows. The original 113 held in the original holder 112 is illuminated by the illuminating lamp 114 while the optical system 115 is moved from one end to the other end of the original 113. As a result, the original image is read out and is converted to electric signals by the light receiving device 118. In response to the signals read by the light receiving device 118, the laser beam from the laser unit 132 is modulated. This modulated beam exposes the photosensitive material 127 taken from the film magazine 126.

The basic concept behind and the detailed description of the foregoing is described in U.S. Pat. No. 4,080,634 entitled "Halftone Reproduction Device with High Resolution Scanning and Recording System" issued Mar. 21, 1978 to Schreiber. This patent is incorporated herein by reference.

The above described conventional apparatus has some problems described below. Since the image is read by a movable optical system, the image reading station housing 111 should include a space S in which the optical system moves and another space for housing the electric control unit 151 for image processing control. As a result, though there is an empty space, the image reading electric control unit 151 must be contained in a narrow space, so that it is difficult to perform maintenance of the image reading electric control unit 151.

The top surface of the housing 131 of the image recording station 130 forms a table on which the housing 111 for image reading station 110 is located. The housing 131 for the image recording station 130 needs to have a substantial height in order to allow one to carry out the image reading operation in a natural position. Therefore, the housing 131 for the image recording station 130 unavoidably has a large inner volume. Consequently, the housing 131 for image recording station contains a film magazine 126 and an image recording control unit 152 and so on but still it has an extra space, that is a dead space D as shown in FIG. 1. Therefore, relatively little space is occupied by the necessary components compared with the whole space occupied by the apparatus itself. In addition, since the necessary components are contained in a narrow space, the maintenance of the electric control units 151 and 152 and correcting troubles such as a jam happened during carrying the photosensitive material are not easily carried out. Furthermore, there is also a problem that the film exchange is difficult since the film magazine 126 is deposited on a low position.

SUMMARY OF THE INVENTION

Therefore, a main object of the present invention is to provide an image reading and recording apparatus which has no appreciable empty space and which allows easy maintenance and easy film exchange.

The above described object of the present invention is attained by combining the housings 111 and 131 and by disposing the electric control units for the image reading and for the film image recording at a dedicated area and by locating the film magazine at a position higher than that in the prior art.

Briefly stated, the image reading and recording apparatus according to the present invention comprises an image reading station including an image forming optical system fixed therein, a film magazine provided horizontally adjacent to the image reading station, an original holder movable in a horizontal direction provided above the image reading station for holding an original such that it is read by the image forming optical system, an image recording station provided below the image reading station and electric control units for image reading and for image recording provided below the image recording station.

Having the structure as described above, the image reading and recording apparatus according to the present invention has the following advantages.

(1) Since the image reading station includes the movable original holder and the fixed image forming optical system, the space for the optical system to move need not be located in the image reading station. The film magazine can be mounted on that saved space. Consequently, the space for mounting the film magazine need not be located in the image recording station. As a result, the unnecessary dead spaces in the apparatus can be dispensed with, providing a more compact apparatus.

(2) Since the electric control units for image reading control and for image recording control are located in dedicated areas having sufficient space, the maintenance of the electric control units are easily carried out.

(3) Since the film magazine is contained in the image recording station housing on the uppermost portion of the apparatus, the film magazine is easily handled.

According to a preferred embodiment of the present invention, the image reading and recording apparatus is as a whole contained in one housing and the housing is separated into three sections in the vertical direction. In the uppermost section in the housing, the image reading station including the fixed image forming optical system and the movable original holder, and a film magazine adjacent thereto are provided. In the second section in the housing, the image recording station is provided and in the third section the electric control units for image reading and for image recording are provided.

By structuring the image reading and recording apparatus as described above, the whole apparatus becomes compact and the maintenance of the electric control units and the adjustment of troubles during yielding of the photosensitive material and so on can be carried out easily.

According to another preferred embodiment of the present invention, the vertically divided three sections in one housing containing the image reading and recording apparatus are separated by partitioning plates, the upper surface of the housing has a lid which can be opened and closed above the film magazine and the housing has its four sides, namely front, rear, left and right, covered with removable decorative panels.

By structuring the image reading and recording apparatus as described above, the maintenance of each part can be carried out more easily and the film exchange can be carried out easily from the top surface of the apparatus.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a schematic cross sectional view of the image reading and recording apparatus according to the present invention.

DESCRIPTION OF THE PREFERRED EMBODIMENT

Figure 1:
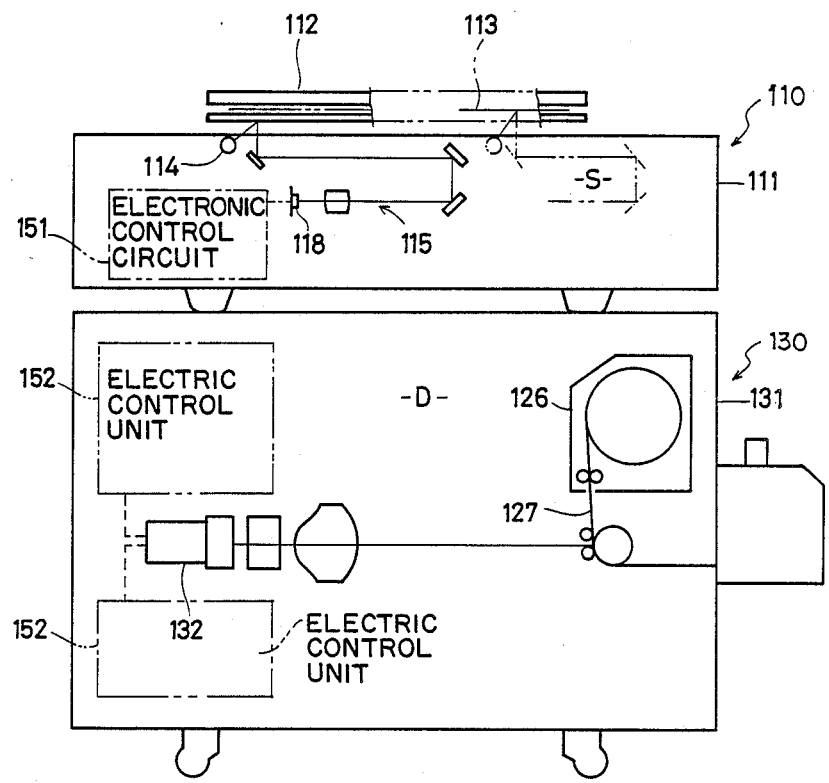
FIG. 1 is a schematic cross sectional view of a conventional image reading and recording apparatus.

One embodiment of the image reading and recording apparatus according to the present invention will be described with reference to FIG. 2.

FIG. 2 is a schematic cross sectional view of the image reading and recording apparatus according to the present invention.

The image reading and recording apparatus comprises a housing containing the entire apparatus, an image reading station 10, an image recording station 30 provided below the image reading station 10 and an electric control unit containing station 50 provided below the image recording station 30 and each of the portions 10, 30 and 50 are separated by partitioning panels.

The image reading station 10 comprises an original holder 12 provided on the housing 11 and moveable from left to right in the direction of the arrow A (and back) a set of illuminating lights 14 which illuminate an original 13 held by the original holder 12 from the lower side thereof, a mirror 16 arranged such that the slit like image of the original 13 illuminated by the illuminating lamps 14 is formed on a line sensor 18, a fixed type image forming optical system 15 including an image forming lens 17, an optical system casing 20 including the optical system 15 and a cooling means 21 including an air introducing fan 22, a wind path switching plate 23 and a ventilating fan 24 etc. When the original holder 12 moves in the direction of the arrow A, the line sensor 18, which includes photosensitive elements such as CCD (charge coupled device), reads the image on the original 13. The read image is converted into an electric signal and applied to the image recording device as an image signal on the time base. Reference numeral 26 denotes a film magazine containing a roll photosensitive material 27. This film magazine 26 is provided in the right side of and adjacent to the area of the image reading station 10 and can be replaced from above the housing 11. The photosensitive material 27 in the film magazine is delivered to an image formation position in the image recording station 30 as will be described below.

The image recording station 30 comprises a recording optical system 31 including a laser unit 32, modulator 33, rotary polygonal mirror 34, a F-theta lens 35 and a correcting lens 36, an image forming roller set 40 provided for carrying the photosensitive surface of the photosensitive material 27 supplied from the film magazine 26 to the image formation position enabling exposure thereof, a cutter device 41, a discharge roller 42 and a removable photosensitive material storage bin 43 for receiving the exposed photosensitive material 27 which can be moved to a developing station. The image recording station 30 is separated from the image reading station 10 by a partition 29. Laser beams are modulated based on the image signals from the image reading station 10 and expose and record an image on the photosensitive material 27. The exposed photosensitive material 27 is cut to the required length and housed in the photosensitive material storage bin 43.

The electric control unit containing station 50 is separated from the image recording station 30 by a partition 39. A number of electric control units 51 including the image reading control circuit and image recording control circuit etc., are contained in the electric control unit containing station 50 and appropriate spaces are provided between each of the units to allow easy maintenance such as repair, inspection, or the like.

Decorative covers 55 are removably attached to four sides of the housing 11. Since they can be removed when needed, for example when maintenance is required, the inside of the image reading station 10, image recording station 30 and the electric control unit containing station 50 can be visually checked.

A console panel is provided on the cover of the front surface, which is not shown in the drawing.

The film magazine 26 can be replaced by moving the original holder 12 to the left and by opening a lid 28 provided on the housing 11 above the film magazine 26. As a result, photosensitive materials 27 having different width can be used depending on output size requirements. The film magazine 26 may be replaced from the front surface or from the right surface.

Meanwhile, the detailed process in which the original image is read at the image reading station 110 and the image is recorded in the image recording station 130 based on the read signal is the same as in the conventional apparatus. An example of such process is described in the previously referenced U.S. Pat. No. 4,080,634 and the same is incorporated herein by reference.

The image reading and recording apparatus according to the present invention is formed such that it is contained in one housing, a movable original holder is provided in the upper portion of the housing, the housing is separated into three sections in the vertical direction, the image reading station including a fixed image forming optical system and the film magazine is provided on the uppermost section in the housing, the image recording station is provided in the second section in the housing, and the electric control unit for the image reading and for image recording is provided on the lowermost section, so that it has an effect that the image reading and recording apparatus becomes compact, the maintenance operation can be carried out easily and the film exchange can be carried out easily.

Although the present invention has been described and illustrate in detail, it is clearly understood that the same is by way of illustration and example only and is not to be taken by way of limitation, the spirit and scope of the present invention being limited only by the terms of the appended claims.

What is claimed is:

1. An apparatus for reading an image of an original and recording said original on a photosensitive material, said apparatus comprising:
    a single housing having an upper section, a middle section located below said upper section and a lower section located below said middle section;
    an image reading station including a fixed type image forming optical system for reading an image of said original, said image reading station being located in said upper section of said housing;
    original moving means for moving said original in a forward and backward direction at a location above said image reading station so as to be scanned by said fixed type image forming optical system;
    magazine means located in said upper section of said housing horizontally adjacent to said image reading station for holding and supplying said photosensitive material, said magazine means dispensing said photosensitive material in the downward direction;
    an image recording station located in said middle section of said housing for recording said image on said supplied photosensitive material located at said image recording station based on a signal read by said image reading station, said image recording station comprising a photosensitive material storage bin at its end, said exposed photosensitive material being stored in said storage bin, said magazine means and said storage bin being located at the ends of the same sides of said image reading station and said image recording station;
    electric control means located in said lower section of said housing for controlling the reading operation of said image reading station and for controlling the recording operation of said image recording station.

2. An apparatus according to claim 1, wherein:
    said housing comprises a frame provided in the upper portion thereof extending in the forward and backward direction;
    said original moving means comprises an original holder provided for holding said original and which is normally held at a first position of said frame and moved to a second position on said frame when said image is read.

3. An apparatus according to claim 2, wherein:
    (A) said housing comprises an opening having a width extending in the left and right direction on the upper portion thereof and being located below said original holder at said first position; and
    (B) said fixed type image forming optical system comprises:
        (1) an illuminating lamp provided below said frame and adjacent to said opening for illuminating an original held by said original holder when said original holder moves to generate an image light of said original;
        (2) a mirror located below said illuminating lamp for changing the advancing direction of said image light to a horizontal direction;
        (3) image formation optical means provided on the changed direction of said image light for forming said image light; and
        (4) photosensitive means provided in front of said image forming lens in the advancing direction of said image light for reading said image light.

4. An apparatus according to claim 3, wherein said image recording station comprises:
    light source provided on one end thereof for exposing said photosensitive material as a function of a read signal generated by said image reading station;
    a recording optical system provided in front of the advancing direction of said light for modulating and converging said light; and
    means for holding said photosensitive material at that position where said light is converged by said recording optical system; and wherein
    said means for holding said photosensitive material comprises means for dispensing said photosensitive material from said magazine means at a constant speed.

5. An apparatus according to claim 1, which further comprises an electric control unit containing station for containing said electric control unit.

6. An apparatus according to claim 5, which further comprises a partition for separating said image reading station, said image recording station and said electric control means containing station from each other.

7. An apparatus according to claim 1, wherein said lower section lies entirely below a first imaginary plane, said middle section lies entirely above said first imaginary plane and below a second imaginary plane which is located above said first imaginary plane, and said upper section lies entirely above said second imaginary plane.

8. An apparatus according to claim 7, wherein said first, second and third sections are physically separated by partitioning panels.

9. An apparatus for reading an image of an original and recording said image on a photosensitive material, said apparatus comprising:
    an image reading station including a fixed type image forming optical system for reading an image of said original;
    original moving means for moving said original in a forward and backward direction on the upper side of said image reading station so as to be scanned by said fixed type image forming optical system;
    magazine means provided horizontally adjacent to said image reading station for holding and supplying said photosensitive material;
    an image recording station provided below said image reading station for recording said image on said supplied photosensitive material based on a single read by said image reading station;
    an electronic control means provided below said image recording station for controlling the reading operation of said image reading station and for controlling the recording operation of said image recording station;

said image reading station, said magazine means, said image recording station and said electric control means all being housed in a single housing, said housing including a lid located on the upper surface of said housing above said magazine means, said lid being movable between an open and closed position whereby said magazine means can be taken out from said housing through said lid.

10. An apparatus according to claim 9, wherein said photosensitve means comprises a charge coupled device.

11. An apparatus according to claim 9, wherein said photosensitive material storage bin is detachable.

12. An apparatus according to claim 9, wherein said source for image recording comprises a laser light.

13. An apparatus according to claim 9, wherein said housing has four sides in front, rear, left side and right side directions and at least one of said four sides is covered with a detachable decorative cover allowing access to the inside thereof.

14. An apparatus according to claim 9, wherein a portion of said photosensitive material storage bin protrudes from said housing.

* * * * *